US005280642A

United States Patent [19]

Hirata et al.

[11] Patent Number: 5,280,642

[45] Date of Patent: Jan. 18, 1994

[54] RADIO RECEIVER FOR IDENTIFYING A REGION TRANSMITTING A BROADCAST SIGNAL

[75] Inventors: Seiichiro Hirata; Hiroshi Nakamura, both of Hyogo, Japan

[73] Assignee: Mitsubishi Denki Kabushiki Kaisha, Tokyo, Japan

[21] Appl. No.: 757,597

[22] Filed: Sep. 11, 1991

[30] Foreign Application Priority Data

Sep. 27, 1990 [JP] Japan ................................ 2-262565

[51] Int. Cl.[5] ................................................ H04B 1/16

[52] U.S. Cl. .............................. 455/186.1; 455/152.1; 455/158.4; 455/161.3

[58] Field of Search ............... 455/152.1, 161.1, 161.2, 455/161.3, 185.1, 186.1, 186.2, 156.4

[56] References Cited

U.S. PATENT DOCUMENTS 4,969,209 11/1990 Schwob ........................... 455/158.4

FOREIGN PATENT DOCUMENTS 0352764 1/1990 European Pat. Off. ......... 455/152.1

56-153827 11/1981 Japan .

*Primary Examiner*—Reinhard J. Eisenzopf

*Assistant Examiner*—Chi Pham

[57] ABSTRACT

The present invention provides a radio receiver which is capable of automatically identifying the region from which a specific frequency is being received, for example, the name of a city or the like only by receiving the frequency therefrom. In the radio receiver according to the present invention as above, first all the reception frequencies within a broadcast reception band are swept to detect the relationship between each of the reception frequencies and level of the electric field intensity of each reception frequency, whereby all the reception frequencies are divided into two groups; the first and second groups, depending on the level of the electric field of each reception frequency. Whereafter, within the region codes stored in the first memory means, those having more number of reception frequencies defined in the first group than a predetermined number are selected, then the nearby regions of the thus selected region codes are searched from the second memory means, so that in the case that the nearby region also includes more number of the reception frequencies defined in the second group than a predetermined number, the region of the thus selected region code is determined as a frequency reception region of this moment.

6 Claims, 4 Drawing Sheets

RADIO RECEIVER FOR IDENTIFYING A REGION TRANSMITTING A BROADCAST SIGNAL

BACKGROUND OF THE INVENTION

1. Field of the Invention

The present invention relates to a radio receiver, specially to a radio receiver which is capable of automatically identifying the region from which a specific frequency is being received, for example, the name of a city or the like only by receiving the frequency therefrom.

2. Description of the Prior Art

Conventionally many broadcasting stations for broadcasting specific category of music such as rock, jazz and so on have been provided in the United States, and if a radio receiver contains a memory means storing broadcasting category identification codes corresponding to respective frequencies in a specified area, such broadcasting stations are easily received only by specifying a category to be required.

However, although there is a conventional method for selecting a specified region such as a manual button and a display unit on which name of the selected region is displayed, such a manual setting operation for receiving frequency from a specified region in a vehicle traveling across the wide continent may be a troublesome work, and sometimes very dangerous. Further, a combined method of a vehicle navigation system for notifying the traveling position of the vehicle and the above conventional region selecting method can also be considered for specifying a region, but such a combined system can not be readily realized since it can result in a very expensive production.

SUMMARY OF THE INVENTION

The present invention has been made in view of the above-mentioned points, and aims to provide a radio receiver which is capable of automatically identifying the name of a city or the like where the vehicle is traveling by sweeping all the frequencies within a broadcast wave reception band by the receiver itself, even in the case that the receiver is a car radio which is located inside the moving vehicle. The radio receiver according to the present invention comprises a frequency receiving section for receiving broadcast frequencies; a first memory means storing region codes and the broadcast frequencies being received in the respective regions corresponding to the region codes, a second memory means storing region codes and nearby region codes corresponding to the nearby regions located within a predetermined distance from the respective regions corresponding to the region codes, means for sweeping all the reception frequencies within a broadcast wave reception band and detecting a relationship between each of the reception frequencies and the respective electric field intensity thereof, a means for diversifying the broadcast frequencies into a first group of frequencies whose electric field intensity is more than a predetermined level and a second group of frequencies whose electric field intensity is less than a predetermined level, a means for selecting region codes having more than a predetermined number of frequencies defined in the first group from the region codes stored in the first memory means, and a means for searching the nearby regions of the selected region codes from the second memory means and determining the region corresponding to the selected region code having a nearby region containing more than a predetermined number of frequencies defined in the second group as the region from which the broadcast wave is received.

In the present invention as above, first all the reception frequencies within a broadcast reception band are swept to detect the relationship between each of the reception frequencies and level of the electric field intensity of each reception frequency, whereby all the reception frequencies are divided into two groups; the first and second groups, depending on the level of the electric field of each reception frequency. Whereafter, within the region codes stored in the first memory means, those having more reception frequencies defined in the first group than a predetermined number are selected, then the nearby regions of the selected region codes are searched from the second memory means, so that when the nearby region also includes more the reception frequencies defined in the second group than a predetermined number, the region of the @s selected region code is determined as a frequency reception region of this moment.

Other objects and features of the invention will be more fully understood from the following detailed description and appended claims when taken with the accompanying drawings.

DETAILED DESCRIPTION OF THE PREFERRED EMBODIMENTS

Figure 1:
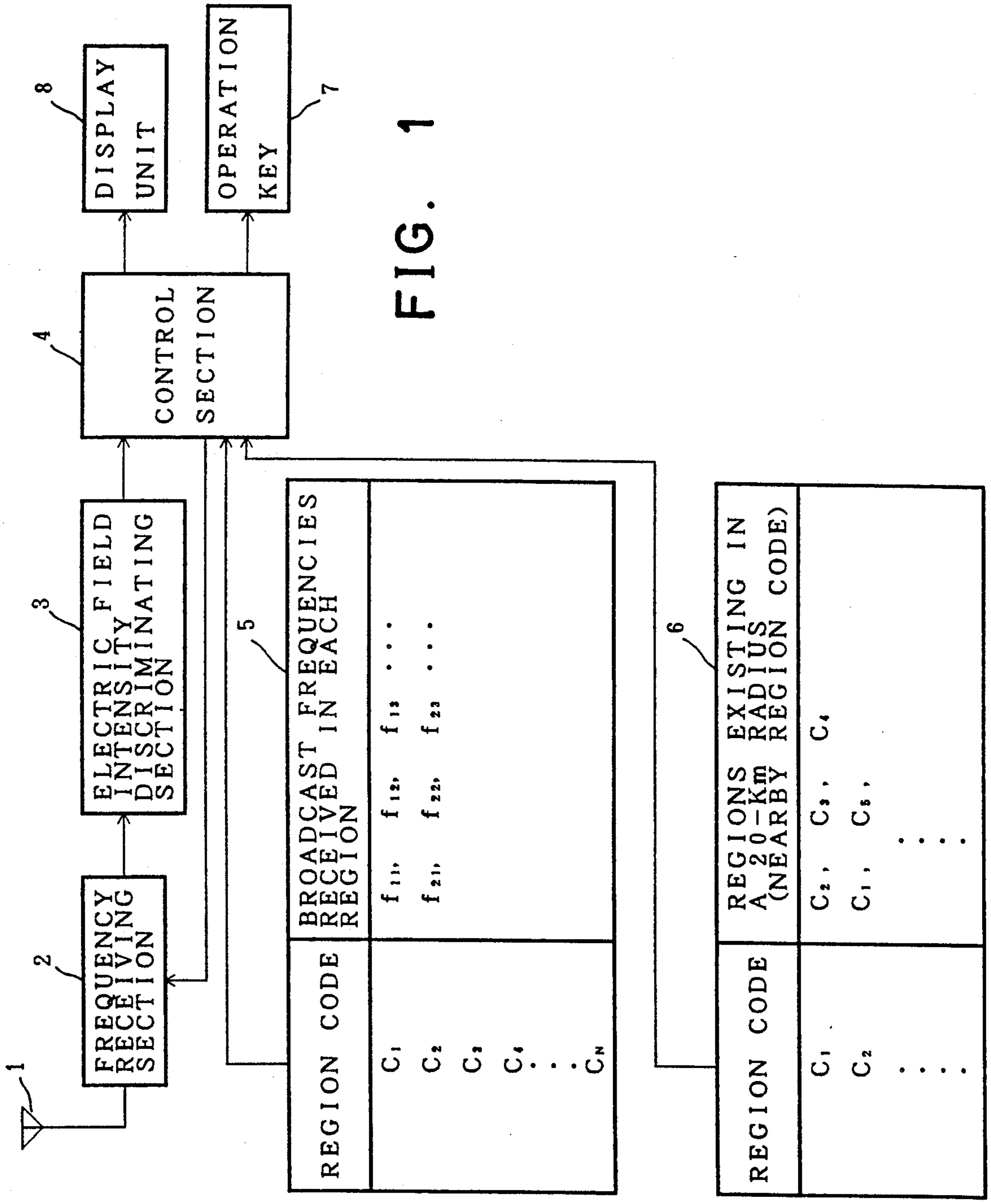
FIG. 1 is a diagrammatic representation of a radio receiver according to the present invention.

The preferred embodiments of the present invention are hereby explained referring to the drawings as below.

Figure 2:
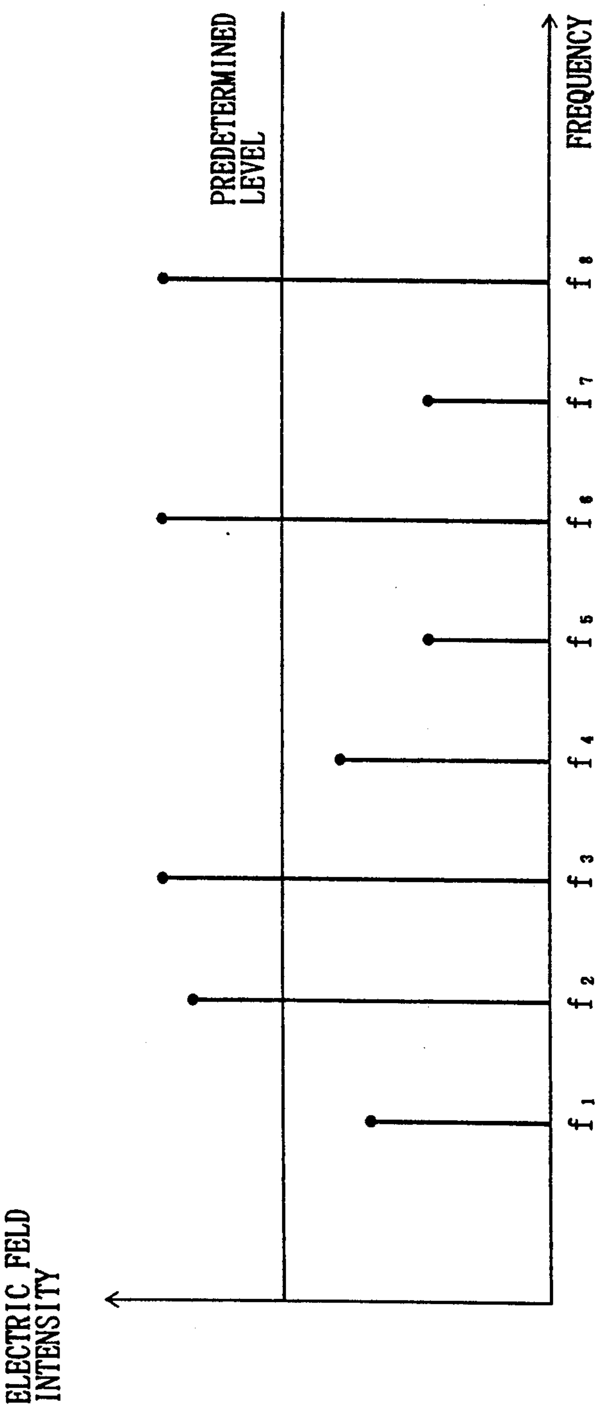
FIG. 2 is a diagram showing a relationship between each of the reception frequencies and electric field intensity of each frequency regarding the radio receiver according to the present invention.
Figure 3A:
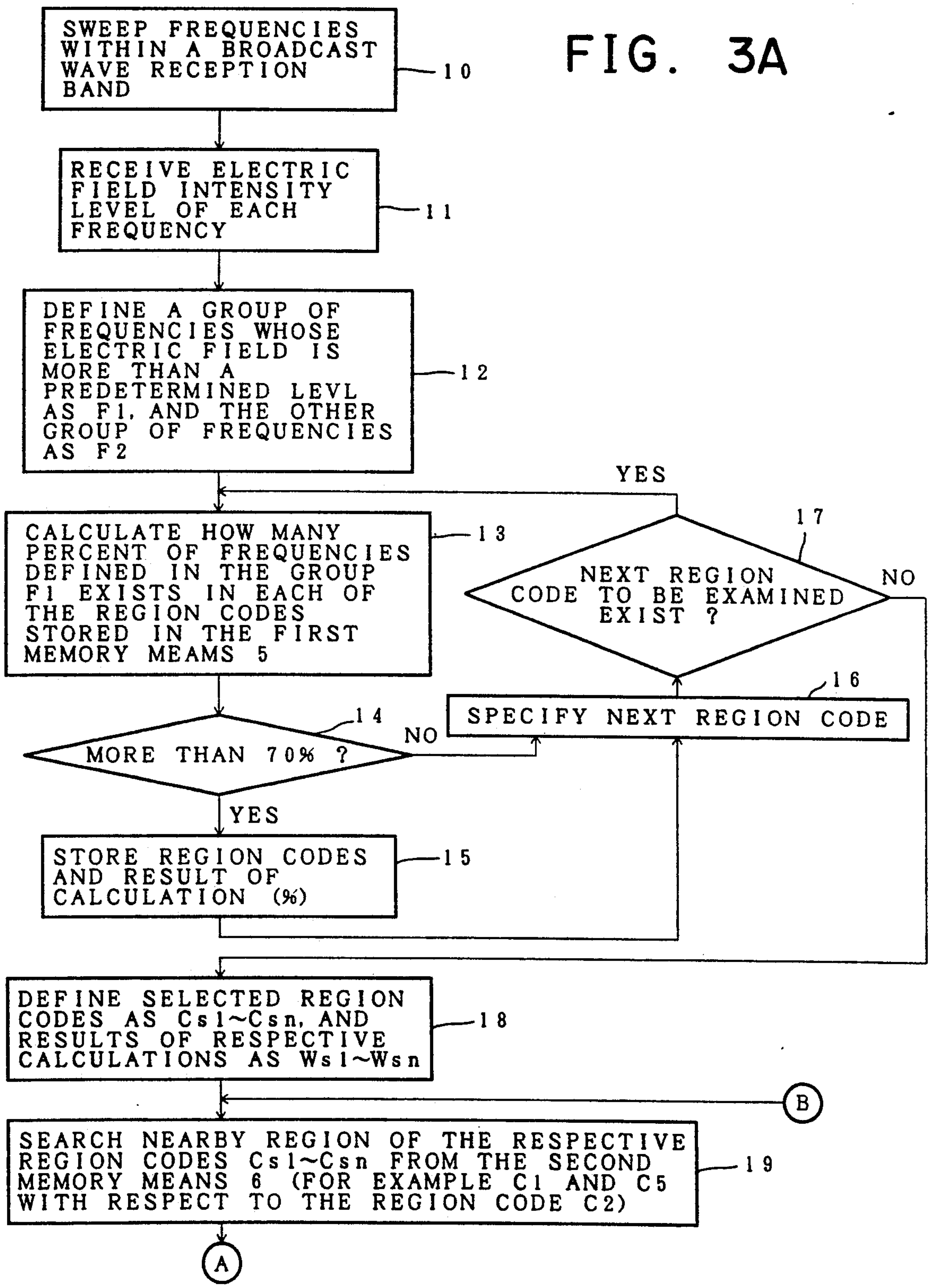
FIGS. 3A and 3B show a flowchart representing the operation of the radio receiver according to the present invention.
Figure 3B:
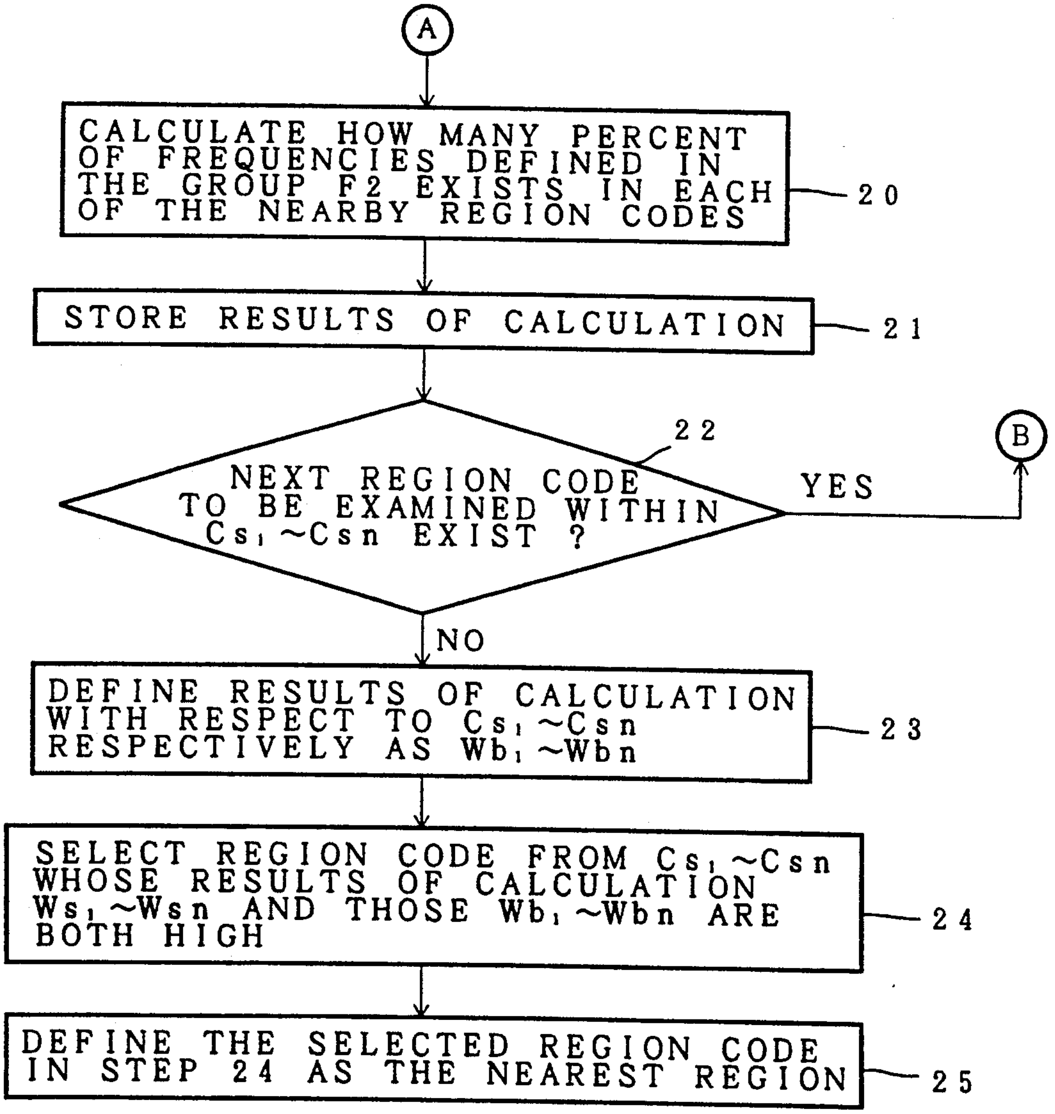

FIG. 1 is a diagrammatic representation of a radio receiver according to the present invention, FIG. 2 is a diagram showing a relationship between each of the swept reception frequencies and electric field intensity of each frequency regarding the radio receiver according to the present invention, and FIGS. 3A and 3B show a flowchart representing the operation of the radio receiver according to the present invention, wherein reference numeral 1 denotes a reception antenna, reference numeral 2 denotes a frequency receiving section, numeral 3 denotes an electric field intensity level discriminating section, 4 a control section, 5, 6 respectively denote a first and a second memory sections, 7 an operation key and reference numeral 8 denotes a display unit.

An operation of the radio receiver constructed as above is now explained referring to the consecutive flowchart shown at FIGS. 3A and 3B. First of all, in step 10, a frequency receiving section 2 receives a command from a control section 4 by way of an operation key 7 to sweep all the frequencies in a broadcast wave reception band and then send electric field intensity of each of the swept frequencies to an electric field intensity discriminating section 3. Whereafter, the electric field intensity discriminating section 3 classifies the electric field intensity level of each frequencies into, for example, two levels and send this information to the control section 4. An step 11, the control section 4 receives signals from the electric field intensity discriminating section 3 and receives electric field intensity level with respect to each of the frequencies fl to f8 as shown at FIG. 2 for example, and in step 12 these frequencies fl to f8 are divided into two groups, wherein the frequencies f2, f3, f6, f8 whose electric field intensity levels are more than a predetermined level are defined in the first group (this group of frequencies is referred to as Fl), and the other frequencies fl, f4, f5, f7 whose electric field intensity levels are less than a predetermined level are defined in the second group (this group of frequencies is referred to as F2). The frequencies being received for each region are stored and the region code respectively corresponding to each region are pre-stored in a first memory means 5, and at step 13, the percent is calculated of the frequencies defined in the first group F1 exists in each region code of the first memory means 5, and if the result is more than 70 percent, each corresponding region code and the calculated result are stored at step 15. At step 16, the next region code is specified and at step 17, it is determined whether or not there exists a next region code to be specified, and if the result is negative, the selected region codes Csl to Csn are registered, and the respective calculated results thereof Wsl to Wsn are also registered. On the other hand, a second memory means 6 pre-stores the same region codes as those stored in the first memory means and nearby region codes corresponding to the regions existing in a 20-km radius from respective regions corresponding to the region codes, and at step 19, nearby regions of each of the region codes Csl to Csn selected at step 18 are further searched from the second memory means 6, and at step 20, the percent it is calculated of the frequencies defined in the second group F2 exists in each of the nearby regions, and then at step 21, the calculated results are stored and in step 22 it is determined whether or not there exists a next region codes Csl to Csn to be checked, and if the result is positive, in other words if there are more region codes to be checked, then steps 19 to 21 are repeated, or otherwise, the procedure advances to step 23 where the results of the calculation Wbl to Wbn with respect to each of the region codes Csl to Csn are outputted. Whereafter at step 24, a region where the results of the calculation Ws1 to Wsn and Wb1 to Wbn are both high is selected, whereby at step 25, the selected region is determined to be the region which is the nearest region to the present location of the vehicle.

Effect of the Invention

By the present invention as constructed above, the region from which a frequency is being received is automatically determined by sweeping all the frequencies within a broadcast wave reception band, and accordingly, if a radio receiver comprises a memory means for storing the broadcasting content identifying codes (category code) corresponding to the respective frequencies in a specific region, it can be comparatively easily performed to receive the frequency of a desired category even in a moving vehicle. In addition, if the radio receiver contains a memory means for storing names corresponding to the specific regions, then the name of the region where the frequency is being received can be displayed in a display means. And further, if the radio receiver contains a memory means for storing names of broadcasting stations corresponding to the frequency of a specific region, then the name of the broadcasting station where the frequency is being received is displayed in a display means.

While the invention has been described with reference to specific embodiments, the description is illustrated and is not to be construed as limiting the scope of the invention. Various modifications and changes may occur to those skilled in the art without departing from the spirit and scope of the invention as defined by the appended claims.

What is claimed is:

1. A radio receiver, comprising:

frequency receiving means for receiving broadcast frequencies;

first memory means for pre-storing region codes and for pre-storing the broadcast frequencies to be received in the respective regions corresponding to said region codes;

second memory means for pre-storing region codes and for pre-storing nearby region codes corresponding to nearby regions located within a predetermined distance from the respective regions corresponding to said region codes;

first means, operatively connected to said frequency receiving means, for sweeping all the reception frequencies within a broadcast wave reception band and for detecting a relationship between each receive frequency and the respective electric field intensity thereof;

second means, operatively connected to said first means, for diversifying the received broadcast frequencies into a first group of frequencies whose electric field intensity is more than a predetermined level and a second group of received frequencies whose electric field intensity is less than the predetermined level;

third means, operatively connected to said first memory means and said second means, for selecting region codes, having more than a first predetermined number of frequencies defined in said first group, from the region codes stored in said first memory means; and reception region determining means, operatively connected to said third means and said second memory means, for searching said second memory means for nearby regions corresponding to the selected region codes and for selecting one region from the selected regions which has a corresponding nearby region containing more than a second predetermined number of frequencies defined in said second group as the region from which the broadcast wave has been received.

2. The radio receiver as claimed in claim 1, wherein said third means comprises first calculating means for calculating a percent of frequencies existing in said first group for each region code stored in said first memory means.

3. The radio receiver as claimed in claim 2, wherein said reception region determining means comprises second calculating means for calculating a percent of frequencies existing in said second group for each nearby region code stored in said second memory means.

4. A method for determining a region from which broadcast signals are transmitted, comprising the steps of:

(a) pre-storing region codes in a first memory region;

(b) pre-storing in the first memory region broadcast frequencies to be received in the respective regions corresponding to the region codes;

(c) pre-storing region codes and nearby region codes corresponding to the nearby regions located within a predetermined distance from the respective regions corresponding to the region codes in a second memory region;

(d) receiving broadcast frequencies;

(e) sweeping all the reception frequencies within a broadcast wave reception band;

(f) detecting a relationship between each received frequency and the respective electric field intensity thereof;

(g) diversifying the broadcast frequencies into a first group of frequencies whose electric field intensity is more than a predetermined level and a second group of frequencies whose electric field intensity is less than the predetermined level;

(h) selecting region codes, having more than a first predetermined number of frequencies defined in the first group, from the region codes stored in the first memory region;

(i) searching the second memory region for nearby regions corresponding to the selected region codes; and (j) selecting one region from the selected regions which has a corresponding nearby region containing more than a second predetermined number of frequencies defined in the second group as the region from which the broadcast wave has been received.

5. The method as claimed in claim 4, wherein said step (h) calculates a percent of frequencies existing in the first group for each region code stored in the first memory region.

6. The method as claimed in claim 5, wherein said step (j) calculates a percent of frequencies existing in the second group for each nearby region code stored in the second memory region.

* * * * *